(12) United States Patent
Elliott

(10) Patent No.: US 6,832,803 B2
(45) Date of Patent: Dec. 21, 2004

(54) TRANSLUCENT TONNEAU COVER AND SYSTEM

(75) Inventor: Byrne Elliott, Logan, UT (US)

(73) Assignee: Global Accessories, Inc., Logan, UT (US)

( * ) Notice: Subject to any disclaimer, the term of this patent is extended or adjusted under 35 U.S.C. 154(b) by 0 days.

(21) Appl. No.: 10/696,777

(22) Filed: Oct. 29, 2003

(65) Prior Publication Data
US 2004/0108746 A1 Jun. 10, 2004

Related U.S. Application Data
(60) Provisional application No. 60/422,825, filed on Oct. 30, 2002.

(51) Int. Cl.[7] .............................. B60P 7/04; B60Q 3/06
(52) U.S. Cl. ........................... 296/100.16; 296/100.01; 362/485; 362/496
(58) Field of Search ...................... 296/100.01, 100.02, 296/100.11, 100.16, 136.1; 362/485, 496

(56) References Cited

U.S. PATENT DOCUMENTS

| 4,479,677 A | 10/1984 | Gulette et al. |
| 4,557,517 A | 12/1985 | Bolduc et al. |
| 4,792,179 A | 12/1988 | Stevens |
| 4,818,006 A * | 4/1989 | Arndt ........................... 296/32 |
| 4,923,240 A | 5/1990 | Swanson |
| 5,522,635 A | 6/1996 | Downey |
| 5,775,765 A | 7/1998 | Kintz |
| 5,795,051 A | 8/1998 | Galanski |
| 5,934,735 A * | 8/1999 | Wheatley ............... 296/100.01 |
| 6,000,821 A * | 12/1999 | Beliakoff ..................... 362/485 |
| 6,116,761 A * | 9/2000 | Munsey ....................... 362/485 |
| 6,238,068 B1 | 5/2001 | Farmer, Jr. |
| 6,309,006 B1 | 10/2001 | Rippberger |
| 6,406,169 B1 * | 6/2002 | Munsey ....................... 362/485 |
| 6,604,834 B2 * | 8/2003 | Kalana ......................... 362/84 |
| 6,655,725 B2 * | 12/2003 | Soldatelli ............... 296/100.01 |
| 6,688,668 B2 * | 2/2004 | Stevens et al. ......... 296/100.16 |

* cited by examiner

Primary Examiner—D. Glenn Dayoan
Assistant Examiner—Greg Blankenship
(74) Attorney, Agent, or Firm—Thorpe North & Western, LLP

(57) ABSTRACT

A truck tonneau for covering a bed of a truck includes a cover having a portion that is at least translucent. The cover can include at least two distinct layers, a first, polymeric layer and a second, fabric reinforcing layer. The fabric reinforcing layer can have a light diffusing pattern formed therein to enhance a light diffusing property of the cover. A fastener can be coupled to the cover to enable fastening of the cover over the truck bed.

32 Claims, 6 Drawing Sheets

TRANSLUCENT TONNEAU COVER AND SYSTEM

This application claims benefit of U.S. Provisional Application No. 60/422,825, filed Oct. 30, 2002, which is incorporated herein by reference.

BACKGROUND OF THE INVENTION

1. Field of the Invention

The present invention relates generally to pickup truck bed covers. More particularly, the present invention relates to a translucent, illuminated tonneau system.

2. Related Art

Pickup trucks represent a large portion of vehicles currently used in North America. The open bed of pickup trucks can be advantageously used for a variety of hauling and storage uses. However, the open bed can be disadvantageous for considerations such as aerodynamics and fuel efficiency. Items stored in the open bed are also subject to weather conditions such as exposure to sun, rain, snow, wind and other adverse conditions which may damage or otherwise adversely affect such stored items.

A variety of solutions are available to pickup truck owners, including shells and tonneau systems. Shells offer increased covered storage capacity but can also partially obstruct views behind the driver. Shells are often relatively difficult to install and remove from a truck bed, and may require the addition of more sophisticated mirror systems for safe driving. Tonneau systems are often more convenient to install and can provide a lower profile cover which allows for significant storage capacity as well as an often desirable low profile appearance. Tonneau covers may be rigid or flexible and are attached in a variety of ways to the bed of the truck. Such systems may also be relatively difficult to install and remove, as significant drilling and/or attachment of semi-permanent fastening systems to the structure of the truck may be necessary.

Tonneau cover systems are most often available in solid opaque colors. Recently, systems have been developed which satisfy various artistic tastes and may be available with patterns or other pictures printed on the opaque cover. One style is to provide lighting on or near a rigid cover so as to produce various illumination effects. Such systems have met with limited success in providing a tonneau system that provides an aesthetically pleasing "glowing" appearance.

SUMMARY OF THE INVENTION

It has been recognized that it would be advantageous to develop an improved tonneau system allowing for superior lighting effects to be created. It has also been recognized that it would be advantageous to provide a light-weight, easily installed illuminated tonneau system. If has been further recognized that it would be advantageous to develop an illuminated tonneau system that provides a "glowing" appearance without also providing the appearance of individual light sources below the tonneau.

The invention provides a truck tonneau for covering a bed of a truck, and can include a cover having a portion that is at least translucent. The cover can include at least two distinct layers, a first, polymeric layer and a second, fabric reinforcing layer. The fabric reinforcing layer can have a light diffusing pattern formed therein to enhance a light diffusing property of the cover. A fastener can be coupled to the cover to enable fastening of the cover over the truck bed.

In accordance with a more detailed aspect of the present invention, the light diffusing pattern formed in the fabric reinforcing layer can include strands separated by gaps. The strands can be substantially opaque.

In accordance with a more detailed aspect of the present invention, the first, polymeric layer can have a textured pattern formed in a surface thereon, the textured pattern further enhancing the light diffusing property of the cover.

In accordance with a more detailed aspect of the present invention, the cover can be less than about 3 mm thick. In one aspect, the cover has a thickness between about 0.5 mm and about 1.5 mm.

In accordance with a more detailed aspect of the present invention, the cover can include at least one decorative portion having a translucence value different than a translucence value of a remaining portion of the cover.

In accordance with a more detailed aspect of the present invention, the cover can be flexible and can have at least two configurations: a first, rolled configuration; and a second, extended configuration.

In accordance with a more detailed aspect of the present invention, a tonneau system for covering a bed of a truck is provided, and can include a cover, including a portion that is at least translucent, the cover being rollable from a first, rolled configuration to a second, extended configuration. A fastener can be coupled to at least one edge of the cover to enable fastening of the cover over the truck bed. At least one cross member can be coupleable to an upper portion of the truck bed, the cross member being configured to provide support to the cover to limit sag of the cover. A light source can be configured to be disposed within the truck bed to transmit light to, and at least partially through, the cover to impart a glowing appearance to the cover.

In accordance with a more detailed aspect of the present invention, a method for providing an illuminated truck tonneau is provided and can include the steps of: covering a bed of the truck with a cover having a portion that is at least translucent; disposing a light source within the truck bed in a location below and distal from the cover; and activating the light source to transmit light to and at least partially through the at least translucent cover.

In accordance with a more detailed aspect of the present invention, the step of disposing the light source within the truck can include the further step of disposing the light source at least about 18 inches from the cover.

In accordance with a more detailed aspect of the present invention, the step of disposing the light source within the truck can include the further step of disposing the light source on a bottom surface of the truck bed.

Additional features and advantages of the invention will be apparent from the detailed description which follows, taken in conjunction with the accompanying drawings, which together illustrate, by way of example, features of the invention.

DETAILED DESCRIPTION

Figure 1:
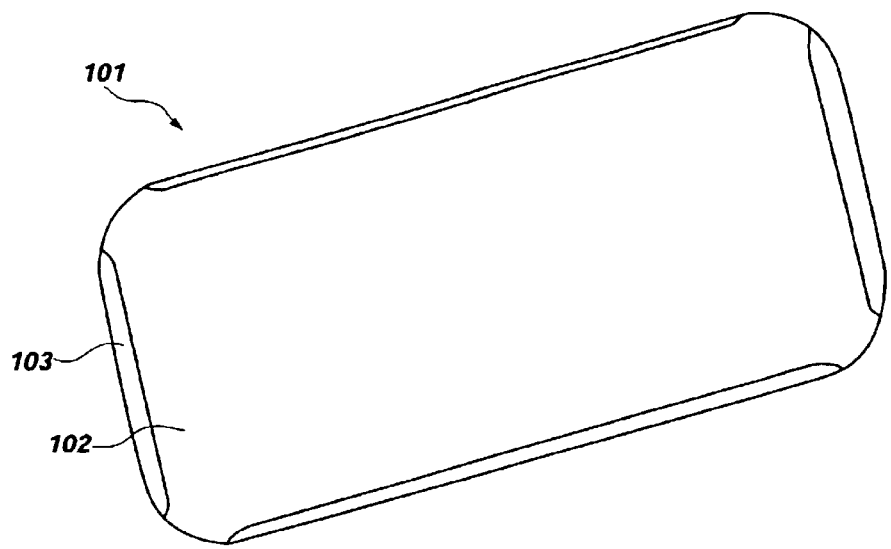
FIG. 1 is a perspective view of a translucent cover in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, a truck tonneau, indicated generally at 101, in accordance with the present invention is shown. The tonneau can be generally formed in a rectangular shape of sufficient size to cover an entire pickup truck bed. The tonneau can also be formed in a size that covers only a portion of the truck bed. The tonneau system of the present invention can be used in a variety of manners and in a variety of applications. The present tonneau cover advantageously provides improved aerodynamics, protection of items stored in the truck bed, and an aesthetically pleasing illumination or glowing appearance.

The tonneau 101 can include a cover 102 that can be made of a variety of materials. The materials can be selected such that a relatively thin formulation will allow at least some visible light to pass through, that is the cover 102 can be at least partially translucent. As used herein, the term "translucent" is to be understood to refer to a property or characteristic of a material that allows at least some light to be transmitted through the material. As used herein, the term "transparent" is understood to refer to a material that transmits all, or nearly all, light directed to the material. In contrast, the term "opaque" is understood to refer to a material that substantially blocks, or does not transmit, all, or nearly all, light directed to the material.

Figure 3:
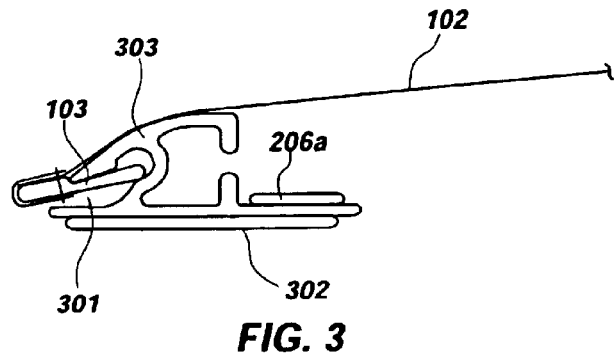
FIG. 3 is a cross-sectional view of a rail in accordance with one embodiment of the present invention.
Figure 4:
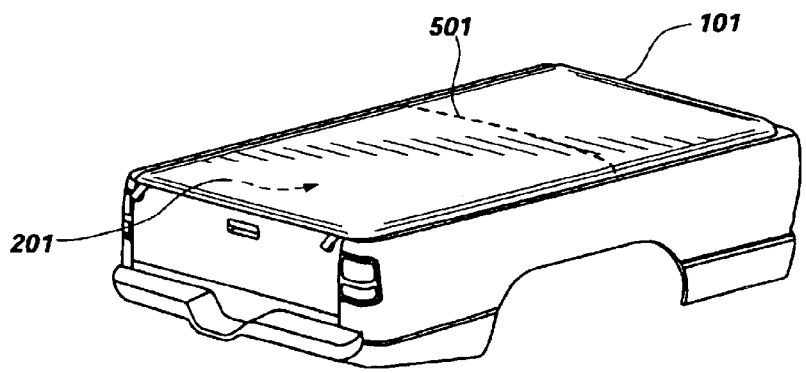
FIG. 4 is a perspective view of the translucent cover of FIG. 1 in an extended configuration.

In one aspect of the invention, as shown by example in FIG. 4, the tonneau 101 can be installed over a truck bed 201. A light or light source (206 in FIG. 2, 206a in FIG. 3 and 712 in FIGS. 9 and 10) can be disposed within the truck bed below the tonneau. Upon activation of the light source, light is transmitted to, and at least partially through, the cover 102 of the tonneau. Thus, the tonneau not only provides protective coverage of the truck bed, the tonneau also provides an aesthetically pleasing "glowing" appearance which lends an immediately identifiable attribute to the truck on which the tonneau is attached. The color of the cover and the light can be varied to alter the resulting glow color of the system.

Figure 7A:
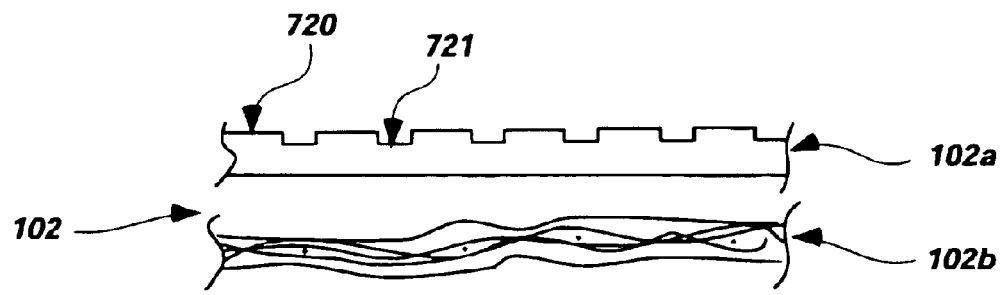
FIG. 7A is a cross-sectional view of a cover having two distinct layers in accordance with an embodiment of the invention.
Figure 7B:
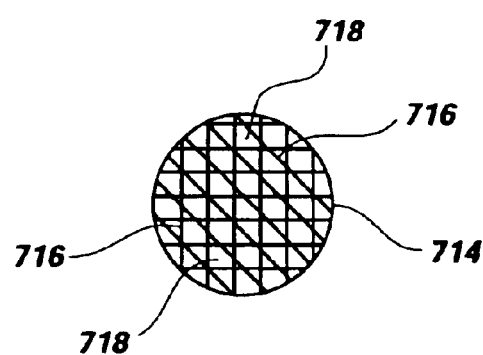
FIG. 7B is a top view of a section of the lower layer of the cover of FIG. 7A.

The glowing appearance created by the system can be altered by the type of cover or cover material utilized. In one aspect of the invention, the flexible cover is a composite material and may be formed of layers. For example, as illustrated in FIG. 7, the flexible cover 102 can include at least two distinct layers, a first, polymeric layer 102a, and a second, fabric reinforcing layer 102b. While not so limited, the fabric reinforcing layer can have a light diffusing pattern formed therein to enhance to a light diffusion property of the cover (the diffusing pattern shown by example at 714 in FIG. 7B). The light diffusion pattern formed in the fabric reinforcing material can be created by individual strands 716 which can intersect, overlap and/or run parallel to each other. In one aspect of the invention, the strands 716 can be separated by gaps 718.

By altering the size of the strands 716 and the gaps 718 between the strands, the light diffusing property of the cover can be adjusted to a particular application. Depending on a desired appearance, the cover may need to diffuse the light transmitted by a light source to a greater or lesser degree. For example, in the case where a light source provides a very bright, localized light, it may be advantageous for the cover to provide a great deal of diffusion to create a "glowing" appearance. Otherwise, in such a case, the cover may not appear to glow, but may instead simply appear as a cover behind which a light source is disposed. As some of the aesthetic appeal of a glowing tonneau is that the tonneau appears to glow as if it is itself a light source, the visual appearance of light sources below the tonneau is disadvantageous.

The present invention addresses this problem in a number of manners. As discussed above, the light diffusing property or value of the fabric reinforcing layer 102b can be altered to provide a differing diffusion value or property of the cover. In one aspect of the invention the strands 716 of the fabric can be substantially opaque. Thus, in the case that the gaps 718 between the strands are made very small, only a limited amount of light will be transmitted by the cover, but the light may be very well diffused after transmission. In contrast, where the gaps are made very large, the cover will transmit more light, but will not diffuse the light to such an extent. Thus, depending on the diffuse quality of the light before passing through the cover, the cover may need to be formed with a greater or lesser diffusion property or value. These considerations are discussed in more detail below, in connection with discussion of the light source or light system utilized in accordance with the present invention.

In addition to the light transmitting qualities of the fabric support layer 102b, the fabric support layer can be provided in order to add strength to the cover material. The fabric support layer can improve physical properties of the cover such as tensile strength, tear resistance, stretch, set, heat shrinkage, cold resistance, flex resistance, etc., all of which enhance durability of the cover.

The first, polymeric layer 102a can also be selected according to various design considerations. For example, the polymeric material can be more or less translucent depending upon the material selected. In addition, in one aspect of the invention, the first, polymeric layer can include a textured pattern formed in a surface thereon. As shown in FIG. 7, the upper surface of the polymeric layer can include peaks 720 and valleys 721 formed therein. The peaks and valleys can form or define the textured pattern, which can have a number of appearances. The textured pattern can be, for example, a "sailcloth" pattern, or other similar pattern, that further enhances the diffusing property or value of the cover.

While the first 102a and second 102b layers of the cover 102 are shown slightly separated in FIG. 7, it is to be understood that, while the layers are distinct, they may be bonded or formed directly one to the other to give the appearance of a single cover material. The layers may even slightly overlap due to manufacturing techniques, which may result in the layers intersecting slightly at the mating interface. In addition, the manufacturing process may meld the two layers to such a degree that the finished cover appears as only a single layer of material.

Figure 8:
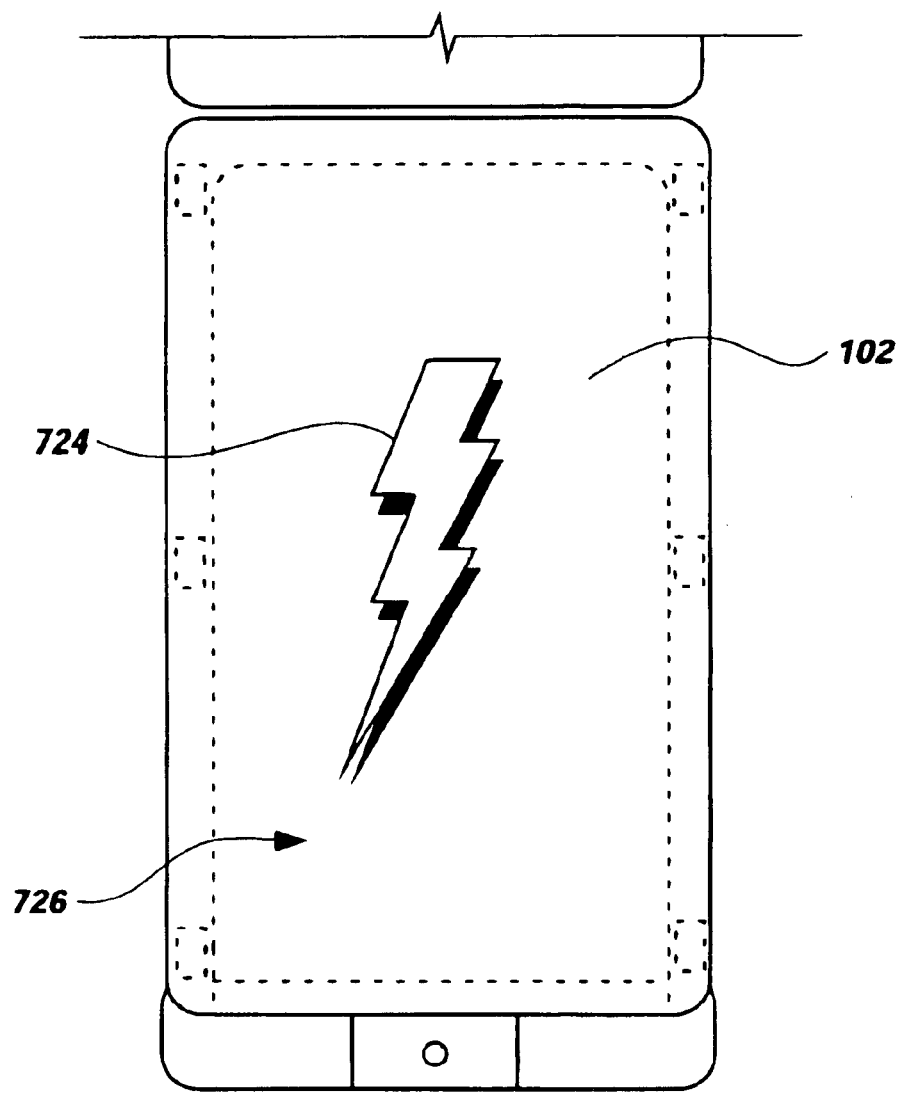
FIG. 8 is a top view of a pickup truck bed having a tonneau installed thereover.

The cover need not be a single material and may have several sections or portions which are a variety of materials and/or translucency. For example, the cover material could be a translucent polymeric material over a front half of the cover, while the back half could be an opaque vinyl. In addition, in the aspect of the invention illustrated in FIG. 8, the cover 102 can include at least one decorative portion 724 that has a translucence value that is different from a remaining portion 726 of the cover. In the example shown, the lightning-bolt pattern can be formed of a substantially opaque material, and can be, for example, silk-screened onto the cover. When the cover is illuminated by the light source (not shown in FIG. 8), the decorative portion 726 will block all, or nearly all, of the light striking the cover under the decorative pattern. Thus, the remaining portion of the cover will glow, and the decorative portion will be silhouetted as a darker image. In addition to the lightning bolt pattern shown, the decorative pattern can be of a wide variety, including personalized decorations, corporate logos, popular catch phrases, etc.

In addition to the opaque decorative portion discussed above, the decorative portion can also have a translucence value that is greater than the remaining portion, providing an appearance of being lighter or brighter than the surrounding area. The decorative portion can thus provide further aesthetically pleasing aspects to the tonneau system described herein.

The cover of the present invention can include a fastener coupled to an edge thereof to facilitate fastening of the cover over the truck bed. The fastener can include attachment means for attaching the cover to the bed. The attachment means can be a variety of those known in the art, including snaps, hook-and-loop fasteners, etc. Also, as shown in FIG. 1, the edges of the flexible cover can include a flexible flange 103 along the perimeter of the cover. The flange 103 can be securely attached to the cover 102 along straight portions of the edges, as shown in FIG. 1.

The flange 103 is typically made of a polymeric material, such as polypropylene impact copolymer or other polymer, which is flexible, but more rigid than the cover material. The flange is designed to secure the cover material to a rail system mounted on the bed of a pickup truck, which rail system is discussed in more detail below. In addition to facilitating attachment of the cover to the truck bed, the flange can be formed of a flexible material which can be rolled with the cover into a roll for storage, as discussed in further detail below.

One factor in designing the translucent tonneau system is the thickness of the cover material. Conventional, hard cover illuminated tonneau systems have proved overly complicated and bulky, and have been formed of covers that are overly thick for optimal use. In contrast, the present invention provides a light-weight illuminated tonneau system. In one aspect of the invention, the flexible cover is less than about 3 mm thick and can range from about 0.5 mm to about 1.5 mm in thickness. By advantageously providing a very thin translucent tonneau cover, the present invention provides a lightweight configuration which makes placement of the cover easier and minimizes excess weight. Further, the thinness of the material enables the cover to be rolled-up and stored to allow for unobstructed use of the truck bed.

In another aspect of the invention, the cover, such as that shown in FIG. 1, is used in conjunction with a truck tonneau rail system. Such a tonneau rail system is described in detail in U.S. Pat. No. 6,309,006 to Rippberger, which is herein incorporated by reference. The tonneau rail system includes a frame upon which the translucent cover may be removably attached. Other rail systems may be used in conjunction with the present invention and are known in the art. One suitable rail system is a snap system which includes a series of snaps along the perimeter of the cover with corresponding studs mounted on the rail. Various snap systems known to those skilled in the art could be used in conjunction with the present invention. One exemplary snap system is disclosed in U.S. Pat. No. 5,522,635, herein expressly incorporated by reference.

Figure 2:
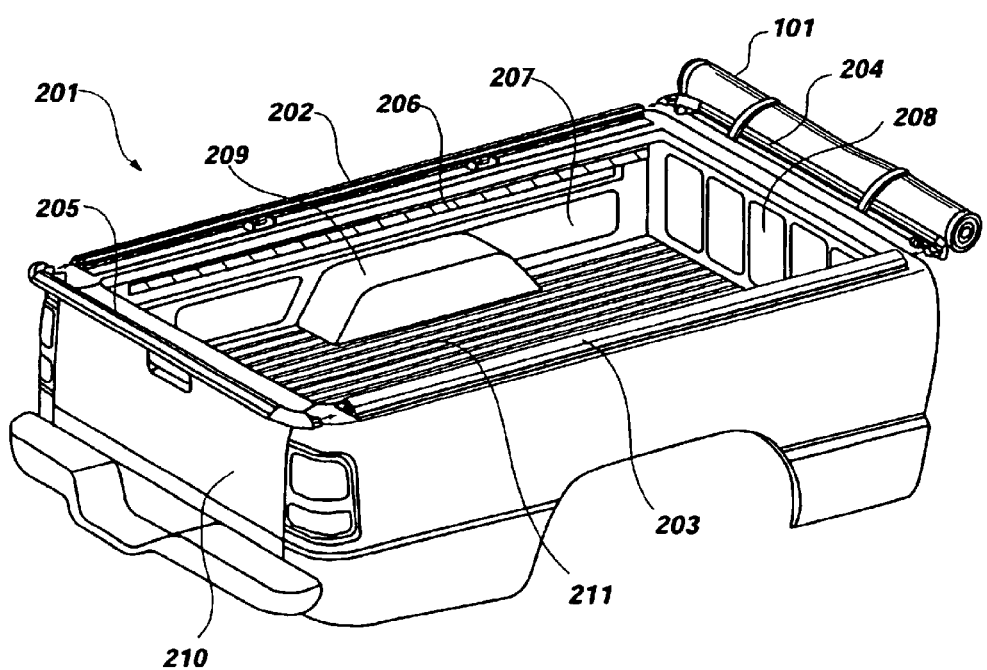
FIG. 2 is a perspective view of a truck bed having the translucent tonneau cover of FIG. 1 being mounted thereon and shown in a rolled-up configuration.

Referring now to FIG. 2, a truck bed is shown generally at 201. A set of rails is attached to the top edges of the truck bed. Any number of rail configurations is possible, and in the embodiment illustrated in FIG. 2, the rail system includes a left rail 202, right rail 203, front rail 204 and rear rail 205. The rails may be joined together using optional corner pieces or otherwise secured. For example, the rails may be secured to each other or solely to the edges of the truck bed. The rails may be attached to the truck bed either removably or semi-permanently, as is known in the art. The rails may be attached by adhesive, fasteners, clamps, or any number of methods which attach the rails to the truck bed securely under normal use. The rails may be semi-permanently or permanently attached to the truck bed. The rail system shown in FIG. 2 is only one possible configuration. Other rail configurations could include rails which are mounted along the inside edge of the side walls such that the system does not add significant height to the profile of the truck bed.

Further, the rails may be made of any material which may be formed into the desired shape and having desirable strength and hardness such as aluminum, steel, polycarbonate, metal alloys, clear rigid PVC or combinations of these materials. Aluminum has proven a lightweight, effective and inexpensive material for use in the rail system. Various additional features may be provided for convenience or for protection of the truck bed. FIG. 3 illustrates an embodiment using a foam 302 to protect the truck bed or as a weather-stripping layer.

In one embodiment of the present invention, the rails are grooved in such a manner as to receive the flexible flange 103 of the translucent cover 101. FIG. 3 shows one possible configuration for the rails and the flexible flange 103 therein. Specifically, the grooves 301 along the rail frame are outwardly facing and downwardly angled. The flexible flange 103 of the translucent cover 101 is inserted into the groove 301 and the translucent cover is pulled taut. The grooved rail system allows the flexible flange to be easily attached and removed. Once the translucent cover is attached, as shown in FIG. 4, the entire bed of the truck is enclosed.

Figure 6:
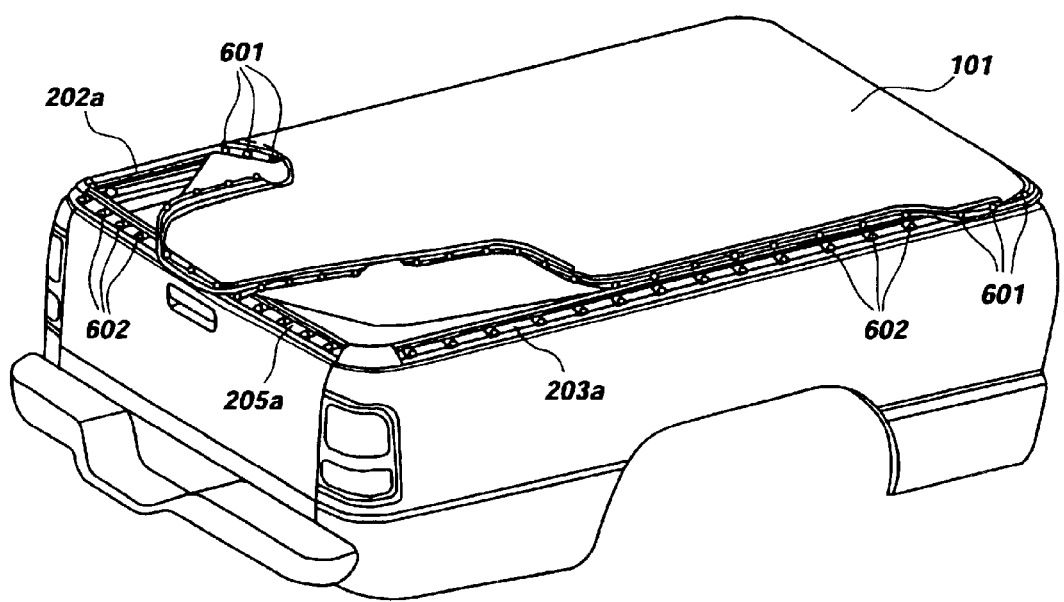
FIG. 6 is a perspective view of a truck bed having the translucent tonneau cover mounted thereon using a snap system.

In addition to the grooved rail system illustrated in FIG. 2, other methods of attaching the flexible cover to the rails are considered to be within the scope of the present invention. For example, instead of a continuous groove, one may provide a series of snaps along the rails to which the cover may be attached, as shown in FIG. 6. Generally, a series of snaps 601 are attached along the perimeter of the flexible cover 101. A corresponding number of studs 602 are mounted on the rails 202a–205a such that the snaps are received onto the studs to fully enclose the truck bed.

Figure 5:
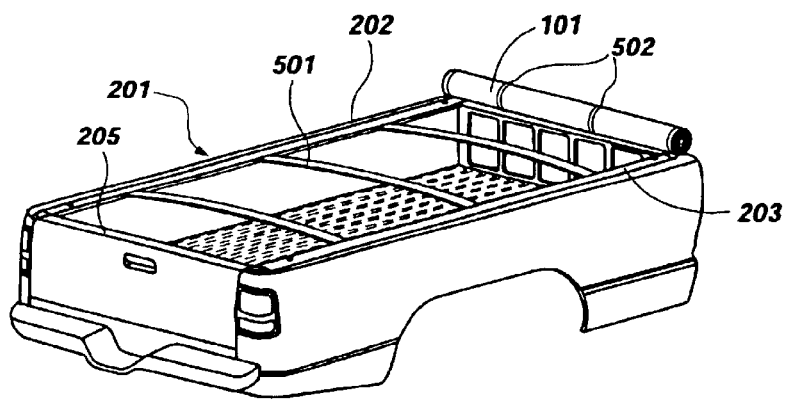
FIG. 5 is a perspective view of the translucent cover of FIG. 1 in a rolled-up configuration.

As shown in FIG. 5, cross members 501 may optionally be placed across the width of the truck bed 201. Because the cover material is flexible, without additional support the cover may tend to sag toward the center, especially under the weight of such materials as rain or snow. The cross members 501 may be slightly bowed upward in the center to reduce collection of material on the top of the cover which would increase wear and decrease the illumination effect of the present invention. These cross members 501 may be removably attached to the rail system such that the truck bed may be fully utilized for hauling large items or other purposes.

The slightly convex shape of the cross members also increases the visibility of the illuminated cover. In an alternative embodiment of the present invention, the cover may be removably attached to a rail system which includes a hinged portion where the cover and a portion of the rail system may be lifted without removing the cover from the rails. For example, the left and right rails could be secured to the side walls of the truck bed only along a front portion of the bed, wherein the left and right rails each include two lengths attached by a hinge or other similar mechanism.

The cross members 501 can also be used to enhance the aesthetic appearance of the glowing tonneau. For example, letters or symbols can be formed as voids in the cross members through which light will freely pass. When supporting a tonneau with a light source beneath the tonneau, the majority of the cross member will appear as a dark, unlighted band under the tonneau, as the material of the cross member is substantially opaque. The letters or symbols formed through the tonneau, however, will allow light to pass through and illuminate the tonneau in the pattern of the letters or symbols. The letters or symbols can also be formed as protrusions or projections from the body of the cross member, to create an opaque letter or symbol pattern around the cross member. The letter or symbol pattern can be of a variety of configurations, including a person's initials, a truck manufacturer's name or symbol, etc.

Referring again to FIG. 2, a light source 206 can be placed beneath the flexible cover material such that emitted light passes through the translucent portion of the cover material and is visible from outside the truck bed. The light source 206 is shown in FIG. 2 as spanning the length of the left side 202 just under the top edge of the left side. However, the light source 206 may be placed in any area within the truck bed which would be beneath the translucent cover when in a closed configuration (such as that shown in FIG. 4). These areas may include surfaces such as, but not limited to, the side walls 207, front wall 208, wheel wells 209, inside surface of the tailgate 210, bed floor 211, on the grooved rails 203–205, in the underside of the top edges of the side walls, or any combination of these surfaces. The rails may also include an additional groove, such as along the top surface 303 (FIG. 3), or surface onto which a light source, such as a light wire, may be placed. The light source 206 may be placed in any orientation such as along the perimeter of the truck bed, diagonally, or any artistic or functional orientation.

Further, the light source 206 may be any type such as standard filament, fluorescent, neon, neon-wire, light-strips or other light-producing devices. FIG. 3 illustrates using a light-strip 206a as the light source which is placed along a flat area of the rail. The light sources may also emit light of any color or combination of colors, depending on the desired illumination effect. Pockets, straps or other structures for attachment to the bottom side of the cover may be provided. The light source may be elongate, in which case the light source may be oriented in any direction such as horizontally, vertically, or diagonally.

As shown in FIGS. 2, 4 and 5, the translucent tonneau cover 101 has at least two configurations including a rolled-up configuration and an extended configuration. In one aspect of the invention, shown in FIGS. 2 and 5, the rolled-up configuration generally entails removing the flexible flange 103 along the rear rail 205 and along both side rails 202 and 203 of the rail system and then rolling the tonneau cover 101 up to the front rail 204 near the cab. The rolled tonneau cover 101 may be secured in this configuration using optional straps 502 or other securing methods. The extended configuration, shown in FIG. 4, entails fully attaching the flexible flange 103 along each of the rails in the associated grooves 301. In the extended configuration, the illumination aspect of the present invention is fully utilized. The rail system having the translucent tonneau cover thereon is generally less than 1.5 inches thick and provides for a very low profile.

In a more detailed aspect of the present invention, the rail system is designed such that the rear rail 205 is attached to left 202 and right side rails 203 and is not attached to the tailgate such that the tailgate may be opened without removing the flexible cover material from the rear rail 205. This configuration allows for quick access to the interior space of the truck bed.

As discussed above, the light source and cover of the present invention can cooperatively affect the appearance of the illuminated tonneau system. While the light source can take a variety of forms, and can be disposed within the truck bed in a variety of locations, in one aspect of the invention the light source is disposed distally from the cover within the truck bed. In this manner, the light source can provide sufficient light to the cover to illuminate the cover but is distanced from the cover a sufficient distance to allow light to diffuse while traveling to the cover. This feature can be appreciated by considering the appearance of a vehicle's headlights as seen from a distance. From a distance, it is difficult to discern if the vehicle has one or two distinct headlights, or light sources, as light produced by the distinct headlights is diffused as it travels through air. As one nears the vehicle, however, the appearance of one or two distinct headlights becomes easier to discern. Similarly, by disposing the light source of the present invention distally from the cover, the distinct appearance of the light source becomes difficult to discern, and the cover appears to "glow" as if it were a light source itself.

Figure 9:
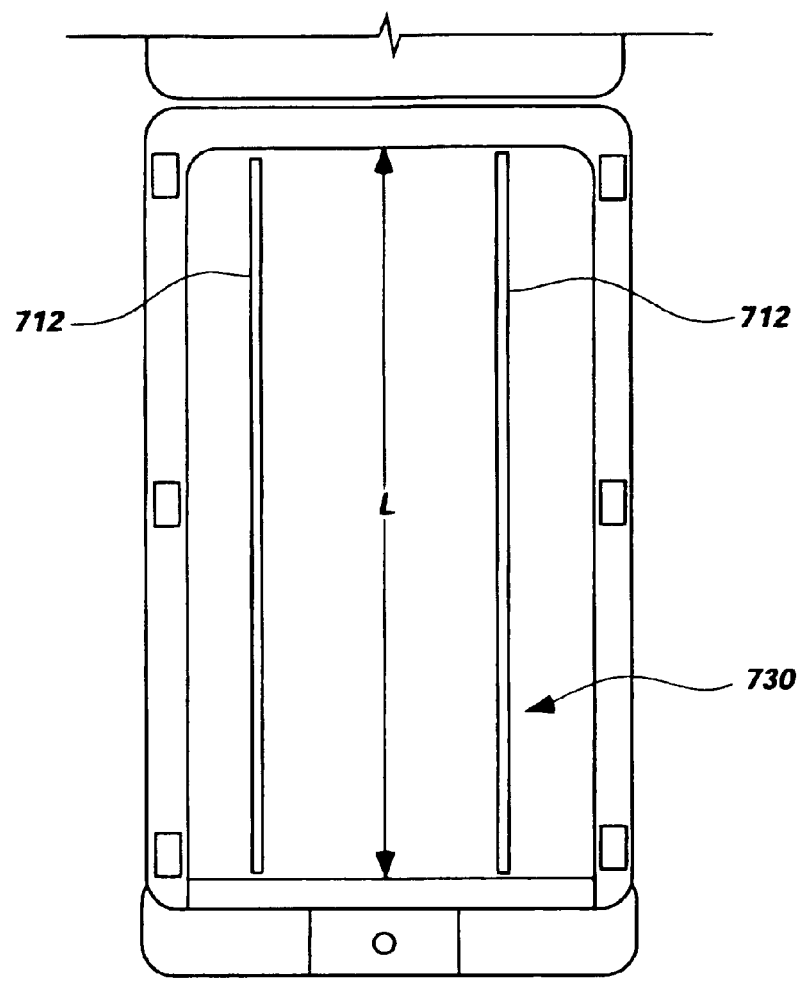
FIG. 9 is a top view of the pickup bed of FIG. 8 with the tonneau removed therefrom.

The light source can be disposed distally in a variety of distances from the cover, and in one aspect is at least about 18 inches from the cover. In another aspect of the invention, as illustrated in FIG. 9, the light source 712 is disposed on a bottom 730 of the truck bed. In this aspect, one or more elongate light sources can be disposed along substantially a full length L of the truck bed. In this aspect, the number and power level of light sources can be minimized, as light is transmitted along a full section of the truck bed. This can lead to a decrease in the number and severity of problems associated with powering and controlling a greater number of light sources.

Figure 10:
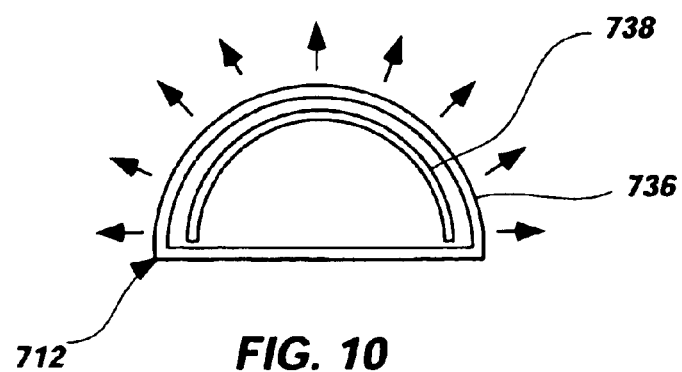
FIG. 10 is a cross-sectional view of a light source in accordance with an embodiment of the invention.

While the elongate light source or sources can be of a variety of types, in one aspect of the invention, shown in cross section in FIG. 10, the light source can include an outer, elongate protective shell 736 that is substantially transparent. An inner, elongate light 738 can be disposed within and can extend along a length of the protective shell. The protective shell can provide a substantially water-tight environment for operation of the light, and can also protect the light from damage due to impact by goods stored in, or people walking in, the truck bed. In one aspect of the invention, the protective shell is formed of a high-impact copolymer material.

The protective shell 736 and light 738 can be formed in a variety of configurations. In one aspect of the invention, the protective shell has a substantially hemispherical cross section, as shown in FIG. 10. In this aspect, the light 738 can be a "light tape," examples of which are known to those in the art. Light tapes are generally flat, elongate strips of material that produce light when an electric current is run therethrough. In one aspect of the invention, the light tape 738 can be disposed within the hemispherical protective shell in an arched, substantially hemispherical configuration. The light tape thus projects light in a 180° radius through the protective shell. In this manner, the light projected by the light tape is further diffused prior to reaching the cover, as much of the light bounces off the floor and side walls of the truck bed prior to reaching the cover.

In accordance with one aspect of the invention, a method is provided for illuminating a truck tonneau, and can include the steps of: covering a bed of the truck with a cover having a portion that is at least translucent; disposing a light source within the truck bed in a location below and distal from the cover; and activating the light source to transmit light to and at least partially through the at least translucent cover. The step of disposing the light source within the truck can include the further step of disposing the light source at least about 18 inches from the cover.

The step of disposing the light source within the truck can include the further step of disposing the light source on a bottom surface of the truck bed. The light source can comprise an elongate light source, and the step of disposing the light source within the truck can include the further step of disposing the light source longitudinally along substantially a full length of the truck bed. The light source can include an outer, elongate protective shell that is substantially transparent, and an inner, elongate light extending along a length of the protective shell.

The cover can include at least two layers, a first, polymeric layer, and a second, fabric reinforcing layer, the fabric reinforcing layer having a light diffusing pattern formed therein to enhance a light diffusing quality of the cover. The first, polymeric layer can have a textured pattern formed in a surface thereon, the textured pattern further enhancing the light diffusing property of the cover. The cover can be less than about 3 mm thick and can have a thickness between about 0.5 mm and about 1.5 mm. It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A truck tonneau for covering a bed of a truck, comprising:
    a cover, including a portion that is at least translucent;
    the cover including at least two distinct layers, a first, polymeric layer and a second, fabric reinforcing layer;
    the fabric reinforcing layer having a light diffusing pattern formed therein to enhance a light diffusing property of the cover; and
    a fastener, coupleable to the cover and being configured to fasten the cover over the truck bed.

2. The tonneau of claim 1, wherein the fastener includes attachment means, coupled to at least one edge of the cover, for attaching the cover to the truck bed.

3. The tonneau of claim 2, wherein the attachment means is selected from the group consisting of: a snap, a hook-and-loop fastener, and a flexible perimeter flange.

4. The tonneau of claim 1, wherein the light diffusing pattern formed in the fabric reinforcing layer includes strands separated by gaps.

5. The tonneau of claim 4, wherein the strands are substantially opaque.

6. The tonneau of claim 1, wherein the first, polymeric layer has a textured pattern formed in a surface thereon, the textured pattern further enhancing the light diffusing property of the cover.

7. The tonneau of claim 1, wherein the cover is less than about 3 mm thick.

8. The tonneau of claim 7, wherein the cover has a thickness between about 0.5 mm and about 1.5 mm.

9. The tonneau of claim 1, wherein the cover includes at least one decorative portion having a translucence value different than a translucence value of a remaining portion of the cover.

10. The tonneau of claim 1, wherein the cover is flexible and has at least two configurations, a first, rolled configuration and a second, extended configuration.

11. The tonneau of claim 1, further comprising a light source, disposable between the cover and the truck bed, the light source being configured to impart a glowing appearance to the cover.

12. A tonneau system for covering a bed of a truck, comprising:
    a cover, including a portion that is at least translucent, the cover being rollable from a first, rolled configuration to a second, extended configuration;
    a fastener, coupleable to at least one edge of the cover and being configured to fasten the cover over the truck bed;
    at least one cross member, configured to be coupled to an upper portion of the truck bed to provide support to the cover to limit sag of the cover; and
    a light source, configured to be disposed within the truck bed, to transmit light to, and at least partially through, the cover to impart a glowing appearance to the cover.

13. The system of claim 12, wherein the light source is disposed distally from the cover within the truck bed.

14. The system of claim 13, wherein the light source is disposed at least about 18 inches from the cover.

15. The system of claim 13, wherein the light source is disposed on a bottom surface of the truck bed.

16. The system of claim 15, wherein the light source comprises an elongate light source disposed longitudinally along substantially a full length of the truck bed.

17. The system of claim 13, wherein the light source includes:
    an outer, elongate protective shell that is substantially transparent; and
    in inner, elongate light extending along a length of the protective shell.

18. The system of claim 17, wherein the elongate protective shell has a substantially hemispherical cross section, and wherein the light comprises light tape and is disposed within the protective shell in an arched, substantially hemispherical configuration.

19. The system of claim 12, wherein the cover includes at least two layers, a first, polymeric layer, and a second, fabric reinforcing layer, the fabric reinforcing layer having a light diffusing pattern formed therein to enhance a light diffusing quality of the cover.

20. The system of claim 19, wherein the first, polymeric layer has a textured pattern formed in a surface thereon, the textured pattern further enhancing the light diffusing property of the cover.

21. The system of claim 19, wherein the cover is less than about 3 mm thick.

22. The system of claim 21, wherein the cover has a thickness between about 0.5 mm and about 1.5 mm.

23. The system of claim 12, wherein the cover includes at least one decorative portion having a translucence value different than a translucence value of a remaining portion of the cover.

24. A method for providing an illuminated truck tonneau, comprising the steps of:
  covering a bed of the truck with a cover having a portion that is at least translucent, the cover having a first, rolled configuration, and a second, extended configuration;
  disposing a light source within the truck bed in a location below and distal from the cover; and
  activating the light source to transmit light to and at least partially through the at least translucent cover.

25. The method of claim 24, wherein the step of disposing the light source within the truck includes the further step of disposing the light source at least about 18 inches from the cover.

26. A method for providing an illuminated truck tonneau, comprising the steps of:
  covering a bed of the truck with a cover having a portion that is at least translucent;
  disposing a light source within the truck bed in a location below and distal from the cover on a bottom surface of the truck bed; and
  activating the light source to transmit light to and at least partially through the at least translucent cover.

27. A method for providing an illuminated truck tonneau, comprising the steps of:
  covering a bed of the truck with a cover having a portion that is at least translucent;
  disposing a light source within the truck bed in a location below and distal from the cover along substantially a full length of the truck bed; and
  activating the light source to transmit light to and at least partially through the at least translucent cover.

28. The method of claim 24, wherein the light source includes:
  an outer, elongate protective shell that is substantially transparent; and
  an inner, elongate light extending along a length of the protective shell.

29. A method for providing an illuminated truck tonneau, comprising the steps of:
  covering a bed of the truck with a cover having a portion that is at least translucent, the cover including at least two layers, a first, polymeric layer, and a second, fabric reinforcing layer, the fabric reinforcing layer having a light diffusing pattern formed therein to enhance a light diffusing quality of the cover;
  disposing a light source within the truck bed in a location below and distal from the cover; and
  activating the light source to transmit light to and at least partially through the at least translucent cover.

30. The method of claim 29, wherein the first, polymeric layer has a textured pattern formed in a surface thereon, the textured pattern further enhancing the light diffusing property of the cover.

31. The method of claim 29, wherein the cover is less than about 3 mm thick.

32. The method of claim 31, wherein the cover has a thickness between about 0.5 mm and about 1.5 mm.

* * * * *